United States Patent Office

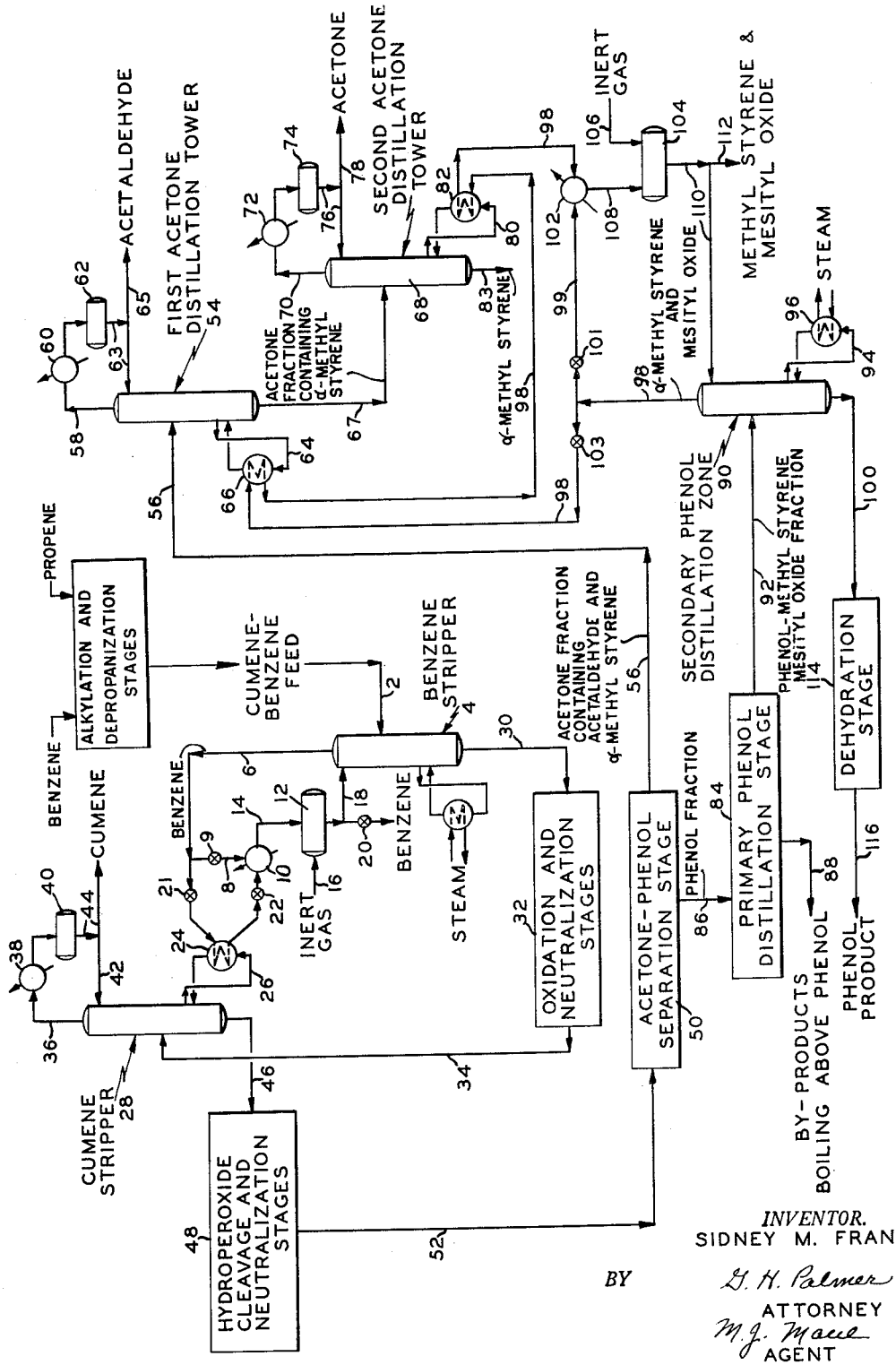

3,215,745
Patented Nov. 2, 1965

1

3,215,745
METHOD FOR TREATING VAPORS FORMED DURING DISTILLATION
Sidney M. Frank, Chatham, N.J., assignor to Pullman Incorporated, a corporation of Delaware
Filed Dec. 7, 1959, Ser. No. 857,871
13 Claims. (Cl. 260—610)

This invention relates to the fractionation of a liquid mixture. In one aspect this invention relates to the separation of azeotropic mixtures. In another aspect this invention relates to the treatment of vaporous fractionator effluents in a chemical synthesis process. Still another aspect of this invention relates to the improved thermodynamic efficiency of industrial chemical synthesis processes. One specific aspect of this invention relates to the preparation of a phenol and the method of separating aromatic compounds by fractionation in the process of the phenol synthesis.

The separation of liquid azeotropic mixtures has presented a constant problem to chemical manufacturers whose processes involve the formation of these mixtures. Many time consuming steps and much expense in providing chemicals to "break" the azeotrope have been utilized in the hope of providing a solution to this problem. One method which has been commercially accepted as an aid to separation, and which is widely in use, involves the addition of a chemical compound to the azeotrope which forms a solution mixture with at least one of the components, but not with all of the components of the azeotrope, which solution mixture has a boiling point markedly at variance with the component or components which do not form a part of this mixture. In this way certain components of the azeotrope can be separated by fractionation. Effective as this method may be, it is nonetheless inefficient from an economical and engineering standpoint, and is often accompanied by additional difficulties which present problems of greater magnitude. For example, the chemical compound employed to "break" the azeotrope may azeotrope with the components it extracts, thus providing additional separation and refinement steps of the nature described above. At best, the formation of the solution mixture necessitates additional fractionation for refinement purposes.

Another objection to the use of a chemical compound for extraction of a component in the azeotrope, in cases where the azeotrope is comprised of a comparatively large number of components, is that the chemical compound may only extract a few of these components leaving components which form new azeotropes. Thus, it is apparent that these disadvantages militate against such procedures.

Other methods of breaking azeotropic solutions such as absorption, e.g., absorption of butadiene in a cuprous salt solution are also employed. However, this method entails subsequent desorption to free the products. Processes wherein the azeotropic solutions are formed include the synthesis of phenols, e.g., phenol wherein phenol-acetophenoe and phenol-mesityl oxide azeotropes are formed.

Numerous processes for the synthesis of phenols have been developed due to the fact that the demand for phenols, particularly cresols and phenol, has exceeded the amount which may be obtained from coal tar. Of these

2 processes, only a limited number have proven commonly feasible. One of the leading processes currently in use comprises reacting benzene with an alkene to produce a dialkylaryl methane, oxidizing the dialkylaryl methane to produce the corresponding hydroperoxide, cleaving the hydroperoxide to produce a product mixture containing phenol and separating phenol from the mixture. The dialkylaryl methyl hydroperoxide is obtained in admixture with some unreacted dialkylaryl methane and aromatic by-products of the reaction and it is necessary to separate the hydroperoxide from these compounds prior to cleavage. Generally, the hydroperoxide has a low volatility and is usually unstable at elevated temperatures so that it is necessary to exercise extreme caution in controlling the conditions under which the hydroperoxide is separated from other hydrocarbons. In accordance with the teachings in the art, the hydroperoxide is separated from the mixture containing it by distillation and the temperature within the distillation zone is provided by a reboiler which operates in indirect heat exchange with steam. In commercial operation, steam does not provide as close a temperature control as desired and is expensive to produce. Therefore, a more economical and efficient method for providing heat is needed to lower the cost of the overall process.

After the hydroperoxide is freed from most of its contaminants, primarily cumene, it is subjected to a cleavage reaction wherein acidic hydroperoxide in the presence of a carbonyl compound undergoes transition to the desired phenol. The product is obtained in admixture with various by-products of the reaction, some of the most troublesome being mesityl oxide, α-methylstyrene and acetophenone. The difficulty in separating these impurities is caused by the tendency of mesityl oxide and other impurities to form an azeotrope with phenol, thus making complete separation impossible because of the formation of a constant boiling mixture. This is a serious commercial problem and one which manufacturers of phenol have gone to great expense to overcome. When the azeotrope is formed, it has been necessary to employ chemical extraction agents to remove mesityl oxide. However, it is recognized that either of these solutions to the problem invoke great expense since they require the use of additional chemicals which may, themselves, contaminate phenol and which must be removed by an additional separation step.

Other processes in which azeotropic solutions are troublesome include butadiene synthesis wherein butadiene-butene-1 and n-butane-trans-butene-2 azeotropes are formed; and ethanol synthesis wherein an ethanol-water azeotrope is formed.

It is therefore an object of this invention to provide a process which avoids the above difficulties while providing a commercially feasible and economical process.

Another object of this invention is to provide a process for the synthesis of phenol, which process possesses marked thermodynamic advantages over those processes known in the art.

Another object of this invention is to provide a method for a more complete and efficient separation of components in an azeotropic mixture.

Another object of this invention is to provide a method for minimizing heat losses in a chemical synthesis process.

Another object of this invention is to recover pure phenol from reaction by-products by a simplified and economically feasible method.

Other objects and advantages of the present invention will become apparent to those skilled in the art from the following description and disclosure.

According to the process of the present invention, a component of a liquid mixture is separated from a component exerting a lower vapor pressure by artificially raising the pressure and the condensation temperature of the vaporous effluent in a refluxed distillation tower wherein said liquid mixture is undergoing distillation. The pressure is raised artificially by imposing a blanket of inert gas over the condensed vaporous effluent in an accumulator or holding drum of the reflux line to the distillation zone. In this way, the component in the liquid mixture which exerts the higher vapor pressure is distilled as a vaporous fraction and the boiling point and condensation temperature of the vaporous fraction or effluent is raised so that it can be condensed at a higher temperature after being utilized to supply heat to another stage in the process, as, for example, by indirect heat exchange. The present process is employed to particular advantage in the distillation of an azeotropic liquid mixture since the induced temperature and pressure increase serves to provide a new, more favorable phase equilibrium between the components in the distillation tower and, as a result, the azeotrope is broken. The procedure of the present invention effects the vaporous removal of the component whose vapor pressure increases at a greater rate with the corresponding increase in temperature. Thus, the separation of components is accomplished directly in the distillation zone and not in later stages of the process after repeated purification.

By way of illustration, the distillation operations to which the process of this invention is preferably applied include: the liquid mixtures of benzene-cumene, mesityl oxide-phenol and acetophenone-phenol. However, it is to be understood in any distillation operation wherein it is desirable to raise the condensation temperature of the vaporous effluent to make it suitable as a source of heat in some other stages of a process, and/or to separate azeotropic mixtures with a greater degree of facility and economy, as in the separation of benzene-methanol, carbontetrachloride-methanol, chloroform-acetone and chloroform-methylacetate mixtures or both, are also included within the scope of the present invention.

When the vaporous effluent of the distillation operation is to be employed as a source of heat to another stage of the process operating at a temperature higher than that of the vaporous effluent, the condensation temperature of the vaporous effluent is raised at least to the operating temperature of that stage and preferably at least about 15° F. higher than the temperature at which that stage of the process is operating. When the separation of an azeotropic mixture is the purpose of the distillation, the condensation temperature of the vaporous effluent is raised to the degree where new phase equilibrium conditions of the azeotropic mixture are established under which conditions the boiling points of the components to be separated, are sufficiently divergent for fractionation separation.

For simplicity in the disclosure and clarity in the description with regard to the manner in which the present invention may be applied, the following discussion will be directed to a general description of the process for synthesizing phenol, although this description is not to be interpreted in any way limiting to this invention any many modifications and changes will occur to one skilled in the art without departing from the scope of this invention, e.g., synthesizing cresol from symene hydroperoxide by a similar process.

Generally the process for making phenol from benzene and propene comprises introducing the reactants to an alkylation zone in the presence of a catalyst at a temperature of from about 300° F. to about 575° F. to form cumene in admixture with some unreacted benzene and propane; separating cumene by distillation of propane and atmospheric distillation of benzene and other by-products; oxidizing cumene in the liquid phase with air or a free oxygen yielding gas at a temperature of between about 190° F. and about 260° F. to produce the corresponding hydroperoxide; stabilizing the hydroperoxide with an alkaline wash and separating unreacted cumene therefrom by distillation at a temperature in excess of 178° F., most preferably by vacuum distillation at a temperature between about 200° F. and about 240° F.; subjecting the cumene hydroperoxide to cleavage with a strong acid catalyst, preferably sulfuric acid at a temperature of between about 130° F. and about 350° F., preferably in the presence of a volatile inert diluent such as, for example, acetone, neutralizing the product mixture which comprises phenol, acetone and a minor proportion of other by-products including acetophenone, dimethylbenzyl alcohol, α-methylstyrene, cumyl phenol, acetaldehyde, water, mesityl oxide and some higher boiling polymeric materials; fractionating the product thus obtained into a light fraction comprising acetone and a minor proportion of acetaldehyde, α-methylstyrene and lighter boiling hydrocarbons and a heavier fraction comprising phenol and hydrocarbon by-products boiling above acetone; purifying the acetone by a series of distillation steps; separating a major portion of the by-products including dimethylbenzyl alcohol, mestiyl oxide, acetophenone and α-methylstyrene from the phenol product by a series of distillation steps and finally dehydrating the phenol to produce a pure product suitable for commercial sales.

According to the present invention, after propane has been distilled from the alkylation product mixture containing cumene and unreacted benzene, the remaining product mixture is passed to a second distillation zone or a refluxed benzene stripper wherein benzene is removed from the cumene product as a vaporous effluent under a pressure of from above atmospheric to about 100 p.s.i.g. The vaporous benzene effluent withdrawn from the top of the distillation tower is super-cooled below its condensation temperature and then passed to an accumulating zone which contains a blanket of inert gas sufficient to maintain the liquid in a totally condensed state and to raise the condensation temperature of the benzene. Thus, the benzene being refluxed to the distillation zone is at a higher temperature than that which normally is employed in the corresponding distillations heretofore employed. As a result of the operating temperature in the benzene stripper being raised, the vaporous effluent leaving the stripper is suitably employed as heat exchange media in another stage of the process where heat requirements are higher than that heretofore provided by the gaseous effluent from the benzene stripper.

Preferred operation in the separation of cumene from benzene involves adding sufficient inert gas to the accumulating zone to raise the condensation temperature of benzene above about 176.5° F. but not above 350° F. Most preferably, a blanket of inert gas is maintained over the reflux liquid sufficient to provide a benzene condensation temperature of between about 220° F. and about 280° F. The vaporous benzene effluent leaving the stripping zone at an adjusted higher temperature is then preferably employed as a heat exchange media with temperature-sensitive material, formed in a later stage of the above-described process, such as, for example, cumene hydroperoxide in the distillation of cumene from said hydroperoxide. Since the vaporous benzene effluent offers better temperature control than steam or other commonly employed heating media, the danger of peroxide explosion is reduced to a minimum.

Another stage of the phenol synthesis where the invention of the present process is advantageously applied, is in the separation of phenol from its by-products, particularly those by-products which azeotrope with phenol, for example, mesityl oxide. After the reaction mixture, containing acetone, phenol and a minor proportion of by-products is formed and the mixture is separated into a light acetone fraction containing acetaldehyde and α-methylstyrene by-products and a heavy phenol fraction containing a minor proportion of α-methylstyrene and mesityl oxide in addition to other contaminating by-products, both the acetone fraction and the phenol fraction are separately subjected to a series of distillation treatments for further purification.

The phenol fraction is passed to a primary distillation zone wherein phenol, α-methylstyrene and mesityl oxide are separated as a vapor from heavier liquid by-products. The phenol mixture is then passed to a secondary distillation zone wherein vaporous α-methylstyrene and mesityl oxide are separated from liquid phenol. This latter distillation step has proved to be extremely difficult in the prior processes for the synthesis of phenol, since mesityl oxide forms an azeotropic mixture with phenol. In order to circumvent this difficulty, manufacturers have tried to separate phenol from these contaminants by the various other methods hereinbefore described such as, absorption, extraction, etc.

Under the conditions of the present invention, however, the presssure on the mixture within the secondary distillation zone is artificially raised by imposing a blanket of inert gas on the overhead reflux drum thus increasing the temperature of the distillation operation. Raising the condensation temperature of the vaporous effluent mixture establishes a new equilibrium for the system so that the boiling points of the phenol and mesityl oxide are sufficiently dissimilar to allow easy separation by distillation. In this operation, mesityl oxide exerts a higher vapor pressure under the new conditions than phenol. Thus, during distillation, the phenol remains a liquid while α-methylstyrene and mesityl oxide are vaporized. These vapors, at a temperature between about 150° F. and about 350° F., preferably between about 200° F. and about 325° F., are advantageously employed as indirect heat exchange media in at least one other stage of the present process. For example, the vapors can be employed to supply heat to an acetone distillation zone.

In the above described process after the light acetone fraction containing acetaldehyde and α-methylstyrene is separated from a heavier phenol fraction, the acetone fraction is passed to a first acetone distillation zone for separation of acetaldehyde. This distillation zone is operated at a temperature between about 150° F. and about 250° F. under from about 10 p.s.i.g. to about 100 p.s.i.g., preferably between about 150° F. and 210° F. under from about 10 p.s.i.g. to about 30 p.s.i.g., in the bottom of the tower. Under these conditions, the acetaldehyde is removed as a vapor from the liquid mixture containing acetone, α-methylstyrene and minor amounts of other contaminants. The resulting liquid mixture from the first acetone distillation zone, after the removal of acetaldehyde, is then passed to a second actone distillation zone from which acetone product is separated as a vapor from high boiling liquid materials including α-methylstyrene. The second acetone distillation zone is operated at a temperature of between about 150° F. and about 300° F., preferably at a temperature of between 160° F. and about 275° F. in the bottom of the tower. The heat necessary to maintain the temperature in either of these towers, or both, can be supplied by the vaporous effluent withdrawn from the second phenol distillation zone. These vapors are passed in indirect heat exchange with liquid material in the bottom of either or both of the acetone distillation zones and then returned to the reflux line of the second phenol distillation zone. This vaporous material is then cooled to a temperature below its condensation temperature, passed to an accumulator or holding drum wherein the liquid is superimposed by a body of inert gas to maintain the material in a liquid state and to maintain the elevated condensation temperature of the vapors, and a portion of this liquid is returned to the top of the second phenol distillation zone as reflux thereto.

Among the gases which are considered to be inert insofar as the phenol synthesis is concerned, are included nitrogen, natural gas, ethane, propane, argon and air. Preferable among these gaseous materials are natural gas and nitrogen. However, it is to be understood that other processes involving other vaporous materials may utilize a blanket of another inert gaseous material such as, for example carbon dioxide, when the carbon dioxide does not react with the vaporous effluent from the distillation zone, Preferably, in the operation of the present process, between about $1/10$ and about $3/5$, and most preferably between about $1/8$ and about $1/2$, the volume of the accumulator or holding drum is occupied by the inert gaseous material, although it is to be understood that smaller or greater amounts of inert material may also be employed, if desired, in order to meet the heat requirements of other stages of the operation or of other operations. It should be recognized, however, that the volume of inert gaseous materials varied directly with the temperature and pressure requirements of the system.

For a clearer understanding of the invention, reference is now had to the accompanying drawing, which illustrates a diagrammatic embodiment of the above-described process.

In a phenol synthesis process, the liquid cumene-benzene product obtained from the reaction between propene with benzene followed by depropanization under conventional conditions in conventional apparatus, is fed into benzene stripper 4 through line 2. The liquid cumene-benzene mixture is fed into tower 4 and is subjected to distillation therein to separate a vaporous benzene fraction from a liquid cumene fraction.

Under the conditions of the present invention, tower 4 is preferably operated at a temperature between about 350° F. and about 475° F. under from about 20 p.s.i.g. to about 55 p.s.i.g. in the bottom of the tower and preferably between about 200° F. and about 300° F. under from about 18 p.s.i.g. to about 50 p.s.i.g. in the top of the tower. A steam reboiler is provided to aid in maintaining the required distillation temperature in zone 4. In starting up this distillation unit, the liquid is distilled under atmospheric pressure, valves 21 and 22 are closed and valve 9 on line 8 is opened. The vaporous benzene effluent is then withdrawn by means of line 6, passed through valved line 8 and into cooler 10 wherein the vaporous product is condensed by indirect heat exchange with water. The material in cooler 10 is withdrawn and passed to holding drum 12 through line 14. The pressure in holding drum 12 is raised and the increase in pressure and resultant increase of the condensation temperature, is effected by imposing a blanket of inert gas, for example, natural gas through line 16 over the body of liquid material in holding drum 12. The condensed liquid having its pressure increased by between about 7 and about 25 p.s.i.g., exits from holding drum 12 at a temperature far below its condensation temperature, for example, between about 130° F. and about 200° F. under from about 15 p.s.i.g. to about 40 p.s.i.g. A portion of the liquid withdrawn from holding drum 12 is recycled as reflux to the top of tower 4 by means of line 18 while a controlled amount of liquid material, which comprises benzene, is withdrawn from the system by means of valved line 20 and, if desired, can be recycled to the alkylation zone for reaction with propene. Thus, the benzene stripper which is normally operated at atmospheric pressure is operated by the process of the present invention at a pressure of between about 18 p.s.i.g. and about 55 p.s.i.g. and the vaporous effluent being withdrawn through line 6 is now usable, due to its increased condensation temperature, a heat exchange media in another stage of the process.

The liquid cumene fraction is withdrawn from the bottom of benzene stripper 4, passed through line 30 into an oxidation stage where cumene is oxidized with air at a temperature generally between about 190° F. and about 260° F. to produce cumene hydroperoxide. The oxidation is followed by a neutralization stage wherein the hydroperoxide product is stabilized by the addition of alkaline material, for example, sodium carbonate. Since the oxidation and neutralization treatments are carried out in the conventional manner, these two stages are indicated by numeral 32 and need no further exemplification. If desired, and generally preferred in the present process, the liquid cumene fraction from tower 4 can be passed to a cumene rerun zone (not shown) prior to the oxidation treatment to separate high boiling liquid by-products from the cumene such as, diisopropylbenzene. As this step is also in accordance with conventional operations in the art, no further discussion is necessary from the standpoint of the present invention.

The neutralized cumene hydroperoxide in admixture with unreacted cumene is withdrawn from the neutralization zone and passed by means of line 34 into cumene stripper 28 which is preferably operated at a temperature of between about 180° F. and about 260° F. and under from about 50 mm. Hg to about 200 mm. Hg in the bottom of the tower. A vaporous cumene fraction is withdrawn from the top of tower 28 by means of reflux line 36, passed to cooler 38 wherein it is condensed, and then to holding drum 40 from which a portion is recycled to the tower by means of line 42 and a portion is withdrawn from the system by means of lines 42 and 44. The distillation in zone 28 results in a more concentrated cumene hydroperoxide fraction by proper temperature control. If desired, however, further purification of the hydroperoxide may be effected. Heat is supplied to tower 28 by means of an external reboiler by withdrawing cumene hydroperoxide liquid from a tray in the lower portion of the distillation tower through line 26, passing the hydroperoxide in indirect heat exchange with reboiler 24 and recycling the heated liquid hydroperoxide to a lower tray in the tower in line 26.

In accordance with the improved process hereindescribed, after starting up unit 4, valved line 8 is closed off by valve 9 and valves 21 and 22 are open to permit the vapors to enter and leave reboiler heat exchanger 24, in indirect heat exchange with liquid cumene hydroperoxide in the external reboiler line 26 of cumene stripper 28. The vapors after leaving heat exchanger 24 are then passed to cooler 10 wherein the vapor is condensed and then passed by means of line 14 to the gas blanketed holding drum 12 from which a portion of the condensed material is withdrawn to serve as reflux to tower 4 by means of line 18 and a controlled portion is withdrawn from the system by means of valved line 20 or recycled to the alkylation zone as hereinbefore described. It is to be understood, however, that in other modes of operation, the vaporous heat exchange media under increased pressure may be partially or totally condensed in the reboiler heat exchanger. If totally condensed therein, the necessity for an additional cooler is removed; however, when the vapors are partially or not at all condensed, suitable apparatus must be employed for totally condensing the vapors prior to their entrance into the gas blanketed holding drum.

This method of supplying heat to the cumene stripper by the higher boiling vaporous effluent from the benzene stripper presents a thermodynamically more efficient process than those employed heretofore wherein heat is supplied to the cumene stripper from an outside source. Specifically, the present improvement saves a process of about 600 b./d. capacity about 7,000,000 B.t.u. per hour. The concentrated liquid cumene hydroperoxide is withdrawn from a lower portion of tower 28 and passed to cleavage and neutralization stages indicated by numeral 48, by means of line 46. The cleavage stage is carried out in accordance with the teachings in the art and the hydroperoxide is contacted with a mineral acid, preferably sulfuric acid and preferably in the presence of volatile diluent such as, for example, acetone at a temperature not higher than about 350° F. The resulting acetone and phenol products of this reaction are then neutralized with a strong alkali such as, for example, sodium hydroxide, sodium phenate, etc., and the neutralized product is transferred in line 52 to stage 50 for a crude separation of acetone and phenol fractions.

The lower boiling acetone fraction, containing acetaldehyde and α-methylstyrene contaminants is then separated and passed to a first acetone distillation zone 54 by means of line 56, which zone is operated at a temperature of between about 150° F. and about 250° F. under from about 10 p.s.i.g. to about 100 p.s.i.g. in the bottom of the tower and between about 100° F. and about 200° F. under from about 5 to about 15 p.s.i.g. in the top of tower 54. A vaporous acetaldehyde fraction is withdrawn from the upper portion of tower 54 by means of line 58, passed to cooler 60 wherein the vapor is condensed and thence to holding drum 62 from which a portion is recycled to the top of tower 54 as reflux thereto in line 63, and a portion is withdrawn from the system as acetaldehyde product in line 65. The temperature in tower 54 is maintained by means of an external reboiler which comprises withdrawing a liquid acetone-α-methylstyrene fraction from a tray in the lower portion of the tower by means of line 64, passing this liquid through indirect heat exchanger 66 and returning the heated liquid to a lower tray in tower 54.

The liquid acetone fraction containing α-methylstyrene contaminant is withdrawn from the bottom of tower 54 and passed by line 67 to a second acetone distillation tower 68 which is operated at a temperature of between about 160° F. and about 275° F. under from about 500 mm. Hg to about 1500 mm. Hg in the bottom of the tower and between about 80° F. and about 170° F., under from about 200 mm. Hg to about 760 mm. Hg in the top of the tower.

A vaporous fraction of acetone is withdrawn from the top of tower 68 through conduit 70, passed to cooler 72 to condense the vapor and then into holding drum 74 from which a portion of the liquid is recycled to the top of the tower 68 through line 76 as reflux thereto and the remaining and major portion of the liquid is withdrawn from the system as acetone product, by means of lines 76 and 78, which acetone may be employed, if desired, as a diluent in the cleavage stage of zone 48. Liquid α-methylstyrene is withdrawn from the bottom of tower 68 by line 83. The temperature in said second acetone distillation tower is maintained by means of an external reboiler which comprises withdrawing a portion of the liquid α-methylstyrene from a tray in the lower portion of said tower by means of line 80, passing the liquid through indirect heat exchanger 82 and returning the heated liquid to a lower tray of tower 68. The liquid material in lines 64 and 80 is passed through the respective heat exchangers (66 and 82) in indirect heat exchange with a gaseous material hereinafter described.

The higher boiling liquid phenol fraction, which is withdrawn from the acetone-phenol separation stage is then passed to a primary phenol distillation zone 84 by means of line 86. In this distillation zone, higher boiling by-products are separated by line 88 from a vaporous phenol fraction containing α-methylstyrene and mesityl oxide contaminants by a conventional distillation method.

According to the present invention, the vaporous phenol-α-methylstyrene-mesityl oxide fraction is then passed to a secondary phenol distillation zone 90 by means of line 92, which zone is operated at a temperature between about 220° F. and about 350° F. under from about 20 p.s.i.g. to about 50 p.s.i.g. in the bottom of the tower and between about 200° F. and about 325° F. under from about 15 p.s.i.g. to about 40 p.s.i.g. in the top of distillation tower 90. The temperature in tower 90 is maintained in part by means of an external reboiler which comprises continuously withdrawing a liquid phenol fraction from a tray in the lower portion of distillation tower 90 by means of line 94, passing the liquid through indirect heat exchanger 96 in indirect heat exchange with steam and returning the liquid to a lower tray in the lower portion of tower 90. Since phenol and mesityl oxide, under normal conditions form an azeotropic mixture, tower 90 is refluxed by imposing a blanket of inert gas over the condensed vapors in the reflux drum. In this way the condensation temperature of the vapors and the operating temperature of zone 90 are raised and maintained. Thus, new equilibrium conditions in the azeotropic mixture are established by artificially raising the pressure with a blanket of inert gas and, as a result, the azeotrope is broken. α-Methylstyrene and mesityl oxide are withdrawn as a vaporous mixture from the upper portion of tower 90 in line 98, while phenol and water are withdrawn as a liquid fraction from the bottom of tower 90 by means of line 100. The vapors in line 98, most preferably at a temperature between about 245° F. and about 300° F. under from about 18 p.s.i.g. to about 25 p.s.i.g., are then passed through heat exchanger 66 and 82 in indirect heat exchange with liquid in lines 64 and 80 respectively. The vapors which enter the heat exchanger at a higher temperature than the liquid therein are cooled and after emerging from heat exchanger 82 are passed to cooler 102 wherein the vapors are condensed and the condensate is then transferred by line 108 to holding drum 104 to which a blanket of inert gas has been introduced and maintained during the distillation operation in zone 90 by means of line 106. A portion of the liquid in holding drum 104 is then recycled to the top of the secondary phenol distillation zone, as reflux thereto in line 110 while the remaining portion of liquid from holding drum 104 is withdrawn from the system by means of lines 110 and 112.

When starting up distillation tower 90, valve 103 is closed and valve 101 is opened so that the vapors are passed from line 98 through by-pass line 99 directly into cooler 102 and then into holding drum 104 wherein the blanket of inert gas establishes the predetermined condensation temperature. The liquid from holding drum 104 is then refluxed to tower 90, to establish new operating conditions therein. After these conditions are established, valve 103 is opened and valve 101 is closed to prevent vapors from passing through by-pass line 99 throughout the duration of the distillation, unless the by-pass line is needed for controlling the amount of material circulated to heat exchangers 66 and 82 in maintaining the proper predetermined temperature therein.

The liquid phenol-water fraction in line 100 is then dehydrated in zone 114 of the process, usually by distillation, and the liquid phenol is recovered therefrom in line 116 as a product of the process which satisfies and exceeds the requirements of U.S. Specification XIII.

It will be obvious to one skilled in the art from the discussion above that many modifications and changes can be made in the process described; however, it is to be understood that these modifications and changes are within the scope of the present invention. For example, the vaporous effluent from tower 90 can be passed in indirect heat exchange with only one of the heat exchangers 66 or 82, if desired, or may be employed as a heating media in another stage of the process depending upon the condensation temperature established in holding drum 104.

The following examples are offered as a better understanding of the present application and are not to be construed as unnecessarily limiting thereto.

*Example 1*

A feed material obtained from the reaction between benzene and propylene which had been subjected to depropanization was analyzed and was found to have the following composition.

| Component: | Pounds |
|---|---|
| Propane | 4 |
| Butane | 52 |
| Hydrocarbon inerts | 6287 |
| Benzene | 37931 |
| Ethyl benzene | 31 |
| Nonene | 102 |
| Cumene | 10095 |
| Butyl benzene | 80 |
| Methyl propyl benzene | 11 |
| Di-isopropyl benzene | 421 |

The materials having the above composition was fed at a rate of 55,014 pounds/hour into a benzene stripper containing 20 distillation trays and operated at a temperature and pressure, in the bottom of the stripper, of 405° F. under 37 p.s.i.g. and, in the top of the stripper, at a temperature of 250° F. under 35 p.s.i.g. Vaporous benzene with hydrocarbon inerts and a minor amount of other contaminants in the vapor phase were withdrawn from the benzene stripper at a rate greater than 44,274 pound/hour, passed in indirect heat exchange with at temperature-sensitive material in another stage of the process hereinafter described, condensed at 160° F. under 30 p.s.i.g. in a cooling zone, passed to a holding drum wherein the condensation temperature of the condensate is adjusted and maintained by a blanket of natural gas at about 240° F. under 20 p.s.i.g., and a portion of the condensate refluxed to the top of said benzene stripper. Thus, the benzene stripper was refluxed. In the holding drum having an inside diameter of 3 feet, 6 inches and a length of about 12 feet, 0.3 pound/mole of natural gas was superimposed as a blanket over the condensed vaporous effluent to provide 1.5 feet of liquid superimposed with 2 feet of vapor therein.

The liquid fraction in the stripping zone which comprised cumene and some higher boiling contaminants was then withdrawn at a rate of 10,740 pounds/hour for further purification in a fractionation zone wherein butyl benzene, methylpropyl benzene and di-isopropyl benzene were separated from cumene. The resulting vaporous cumene was then condensed and subjected to oxidation with air, under conditions herein-discussed to produce a liquid mixture comprising cumene hydroperoxide and unreacted cumene. This liquid mixture was fed into a cumene stripper which was operated at a temperature and pressure, in the bottom of the distillation tower, of 210° F. under 80 mm. Hg and, in the top of the tower, of 174° F. under 55 mm. Hg. In the cumene stripper, the cumene was separated as the vaporous effluent from liquid cumene hydroperoxide. The operating temperature was maintained in the cumene stripper by means of an external reboiler which comprised removing liquid material from the stripper at a temperature of approximately 190° F. and returning said liquid after passing through an indirect heat exchanger, in indirect heat exchange with the vaporous effluent from hereinabove described benzene stripper, at a temperature of about 210° F. The cumene hydroperoxide, after further concentration, was then withdrawn as the product of the process.

*Example 2*

A feed material obtained from the cleavage of cumene hydroperoxide in the presence of sulfuric acid and an acetone diluent and treated with a phenolate solution (sodium phenolate) to provide an alkaline liquid mixture was passed to a preliminary separator. The feed material contained 6688 pounds of phenol; 7901 pounds of acetone; 2535 pounds of water and lesser amounts of α-methylstyrene, mesityl oxide, acetaldehyde and other contaminants in the order given.

In the preliminary separator, a vaporous acetone fraction containing acetone, water, acetaldehyde, α-methylstyrene and minor portions of other contaminants, was separated from a liquid phenol fraction containing phenol, water, α-methylstyrene, mesityl oxide and higher boiling hydrocarbons. The phenol fraction was then passed to a primary distillation zone wherein the hydrocarbons boiling above phenol were separated as a liquid from the vaporous phenol fraction containing, in addition to phenol, minor proportions of water and mesityl oxide and α-methylstyrene.

The above vaporous fraction was fed into a secondary phenol distillation zone which was operated at a temperature and pressure, in the bottom of the tower, of 293° F. under 23 p.s.i.g. and, in the top of the tower, of 260° F. under 20 p.s.i.g. The operating temperature in the bottom of the secondary distillation zone was maintained, in part, by means of an external reboiler in indirect heat exchange with steam. In this distillation zone, all of the mesityl oxide, α-methylstyrene and other contaminants were separated as a vaporous fraction from a liquid fraction comprising phenol and water. The vaporous fraction was withdrawn and passed in indirect heat exchange with units operating in other stages of the phenol synthesis process. The vapors leaving the heat exchange zone were cooled and then passed to a cooler wherein the vapors were condensed. The condensate was then transferred to a confined holding zone in which 0.3 pound/mole of natural gas was imposed over the condensate to maintain the operating temperature in the secondary distillation zone to adjust and maintain the condensation temperature of the effluent at about 240° F. under about 20 p.s.i.g. A portion of the condensate was then refluxed to the top of the secondary distillation zone while the remaining portion was recycled to the primary separator. The liquid phenol fraction is withdrawn from the bottom of the secondary distillation zone and dehydrated to produce a phenol product of excellent quality.

The acetone fraction from the preliminary separator was fed to a first acetone distillation zone which was operated at a temperature and pressure, in the bottom of the tower, of 178° F. under 13.7 p.s.i.g. and, at the top of the tower, of 135° F. under 10.2 p.s.i.g. In the primary acetone distillation zone, acetaldehyde and some acetone was separated as a vaporous effluent from a liquid acetone fraction containing, in addition to acetone, minor proportions of water, α-methylstyrene and other contaminants. The distilled liquid acetone fraction was then transferred to a secondary acetone distillation zone which was operated at a bottom temperature and pressure of 212° F. under 750 mm. Hg and a top temperature and pressure of 118° F. under 550 mm. Hg. In the secondary acetone distillation zone, two vaporous fractions of acetone and water were withdrawn from the upper portion of the tower while the remaining liquid, comprising essentially water, α-methylstyrene and other contaminants was withdrawn from the bottom of the tower. Thus, acetone was recovered from the process.

Heat was supplied to the primary and secondary acetone distillation zones by means of separate reboilers, each of which comprised passing a part of the liquid in the lower portion of the respective distillation zones through indirect heat exchangers in indirect heat exchange with the vaporous effluent from the secondary phenol distillation zone and returning the heated liquid to a lower portion of the tower below the reboiler withdrawal, to their respective acetone distillation zones. In this way, the vaporous effluent from the secondary phenol distillation zone was removed substantially free of phenol product and was utilized as a source of heat to the above-described acetone distillation zones. Thus, by the process of this invention, the formation of azeotropic mixtures of phenol and mesityl oxide or phenol, mesityl oxide and α-methylstyrene, were avoided and the vaporous effluent, which was withdrawn at a higher than normal temperature from the secondary phenol distillation zone, was advantageous in improving the thermodynamic efficiency of the present process. By employing this vaporous effluent as a source of heat for the first and second acetone distillation zones in the present operation, approximately 7,000,000 B.t.u. of heat energy were conserved which would otherwise be supplied from an outside source, such as steam.

Having thus described my invention I claim:

1. In a distillation process, the method of raising the temperature of the distillation operation which comprises: in a closed system, distilling a liquid mixture in a distillation zone to provide a vaporous overhead fraction and a liquid bottom fraction, withdrawing and condensing the vaporous fraction, passing the resulting condensate to a confined holding zone, introducing an inert gas into said holding zone to superimpose the body of liquid therein and to exert a pressure thereon, and recycling at least a portion of the condensate from the holding zone at a higher pressure to the upper portion of said distillation zone whereby the condensation temperature of the condensate and the operating distillation temperature of the liquid mixture in the distillation zone is raised and controlled by the pressure imposed by the inert gas.

2. In a chemical synthesis process, the method of distilling a liquid mixture in a first stage of the process and employing the resulting vaporous effluent as heat exchange media to supply heat to a second stage of the process which is carried out at a temperature at least as high as the temperature at which the vaporous effluent is normally withdrawn from the distillation zone which comprises: distilling a liquid mixture in a distillation zone to provide a vaporous overhead fraction and a liquid bottom fraction, withdrawing and condensing the vaporous fraction, passing the resulting condensate into a confined holding zone, introducing an inert gas into said holding zone in sufficient amount to raise the condensation temperature of condensate to a temperature at least as high as the temperature which is desired in said second stage of the process, recycling a portion of the condensate from said holding zone to the upper portion of said distillation zone whereby the condensation temperature of the condensate and the operating distillation temperature of the liquid mixture is raised and controlled by the pressure imposed by the inert gas and in the distillation zone distilling a vaporous effluent formed under the higher temperature conditions imposed in the holding zone and passing said effluent in heat exchange with said second stage of the process to supply heat thereto.

3. In a process for the separation of azeotropic liquid mixtures the improvement which comprises: distilling said azeotropic liquid mixture in a distillation zone to provide a vaporous overhead fraction and a liquid bottom fraction, withdrawing and condensing the vaporous fraction, passing the resulting condensate, into a confined holding zone, introducing an inert gas into said holding zone to raise the condensation temperature of the condensate so that a new equilibrium between the components of the condensate is established, breaking the azeotrope in the holding zone by the pressure imposed by the inert gas, recycling the condensate from the holding zone to the upper portion of said distillation zone whereby the condensation temperature of the vaporous effluent and the operating distillation temperature of the liquid mixture is raised and controlled by the pressure imposed by the inert gas, and thereafter distilling a component of the former azeotropic mixture as the vaporous effluent from at least one of the remaining unvaporized components of the azeotrope in the distillation zone.

4. In a process for producing an aromatic hydroperoxide wherein a phenyl compound is alkylated with an olefin in an alkylation zone, the resulting liquid alkylate mixture is subjected to distillation in an alkylate distillation zone for removal of the unreacted phenyl compound as a vaporous effluent, the liquid alkylate is oxidized to produce the corresponding hydroperoxide in admixture with unreacted alkylate and the unreacted alkylate is separated as a vapor from the liquid hydroperoxide by distillation in a hydroperoxide distillation zone the improvement which comprises: withdrawing and condensing the vaporous phenyl effluent from the alkylate distillation zone in a cooling zone, passing the cooled effluent to a holding zone, introducing an inert gas into said holding zone, in such amount that the condensation temperature of the condensate is raised at least to the operating temperature of the hydroperoxide distillation zone, recycling a portion of the condensate in the holding zone to the alkylate distillation zone, thereafter withdrawing a vaporous unreacted phenyl effluent formed under the higher condensation temperature condition imposed by the inert gas in the holding zone, passing the phenyl effluent in indirect heat exchange with liquid hydroperoxide in the hydroperoxide distillation zone to supply heat to said zone, condensing the heat exchanged phenyl effluent vapors and returning the condensate to the holding zone and recycling a portion of the condensate to the top of the alkylate distillation zone as a reflux of controlled and elevated pressure.

5. The process of claim 4 wherein the remaining portion of condensate which is not recycled to the alkylate distillation zone is recycled to the alkylation zone.

6. The process of claim 4 wherein the condensation temperature of the condensate in the holding zone is raised at least 15° F. above the operating temperature of the hydroperoxide distillation zone.

7. In a process for producing cumene hydroperoxide wherein benzene is alkylated with propene, the resulting liquid alkylate mixture containing cumene is subjected to depropanization followed by distillation in a cumene distillation zone for the removal of benzene, the distilled liquid alkylate comprising cumene is oxidized in an alkaline medium to produce cumene hydroperoxide in admixture with unreacted cumene and cumene is separated from cumene hydroperoxide by distillation in a hydroperoxide distillation zone at a temperature of at least 178° F., the improvement which comprises: passing the depropanized alkylate to the cumene distillation zone wherein benzene is vaporized and separated from liquid cumene, condensing the vapor in a cooling zone, withdrawing the condensate from said cooling zone and passing said condensate to a confined holding zone, introducing an inert gas into said holding zone in sufficient amount to raise the condensation temperature of the condensate to at least 178° F. and to a temperature at least as high as the distillation temperature employed in the hydroperoxide distillation zone, recycling a portion of the condensate to the upper portion of said cumene distillation zone whereby the condensation temperature of the benzene vapors and the operating distillation temperature of the liquid mixture in the cumene distillation zone is raised and controlled by the pressure imposed by the inert gas, passing liquid alkylate treated for the removal of benzene to said oxidation zone, transferring the resulting liquid product from said oxidation zone to said hydroperoxide distillation zone, maintaining the temperature in said hydroperoxide distillation zone by passing the vaporous benzene effluent formed in the cumene distillation zone under the higher temperature conditions, prior to cooling, in indirect heat exchange with liquid in the hydroperoxide distillation zone to supply heat thereto and to cool the benzene vapors before refluxing to the cumene distillation zone.

8. The process of claim 7 wherein sufficient inert gas is introduced to the holding zone to raise the condensation temperature of the condensate to between about 200° F. and about 300° F. and the hydroperoxide distillation zone is operated as a temperature between about 180° F. and about 260° F. and below the condensation temperature of the benzene vapors.

9. The process of claim 7 wherein the inert gas comprises natural gas.

10. The process of claim 7 wherein the inert gas comprises nitrogen.

11. In a method for the preparation of a phenol from a cumene-benzene mixture which comprises separating benzene from said mixture, oxidizing the remaining cumene to the corresponding cumene hydroperoxide, acid cleaving said peroxide to the corresponding phenol, and separating the phenol from a mixture comprising phenol and by-products of said acid cleavage reaction, in which at least one of said separation steps comprises distilling a liquid mixture in a distillation zone to provide a vaporous overhead fraction and a liquid bottom fraction, withdrawing and condensing the vaporous fraction and recycling at least a portion of the condensate to the upper portion of the distillation zone, the improvement which comprises: passing the condensate to a confined zone and superimposing an inert gas on said condensate prior to recycle so that said condensate is returned at a higher pressure to said distillation zone the condensation temperature of the condensate is raised and the operating distillation temperature of the liquid mixture in the top of the distillation zone is thus raised and controlled by the pressure imposed by the inert gas.

12. In a method for the preparation of a phenol from a cumene-benzene mixture which comprises oxidizing the cumene to the corresponding cumene hydroperoxide, acid cleaving said peroxide to the corresponding phenol and separating the phenol from an azeotropic mixture comprising phenol and α-methylstyrene and mesityl oxide by-products of said acid cleavage reaction the improvement which comprises: separating phenol from said by-products by distilling the azeotropic mixture in a distillation zone to provide a vaporous overhead fraction and a liquid bottom fraction at a temperature between about 200° F. and about 350° F. under from about 15 p.s.i.g. to about 50 p.s.i.g., withdrawing and condensing the vaporous fraction comprising the azeotropic mixture of phenol and by-products, passing the condensate to a confined zone, superimposing an inert gas on said condensate to increase the pressure of the condensate by between about 7 and about 25 p.s.i. to break the phenol-by-product azeotrope, recycling at least a portion of said pressurized condensate to said distillation zone and separating vaporous by-products from liquid phenol in the distillation zone under the increased pressure condition imposed and controlled in the holding zone.

13. In a process for producing a phenol wherein an aromatic hydroperoxide is subjected to cleavage in the presence of a mineral acid and a volatile diluent to produce a liquid mixture containing a phenol and a ketone in admixture with other hydrocarbon and oxyhydrocarbon by-products, the liquid mixture is separated into a phenol fraction containing said phenol and a ketone fraction, and the ketone fraction is passed to a ketone distillation zone wherein an oxyhydrocarbon boiling below the ketone is separated as a vapor from the liquid ketone, the method of separating the phenol from the phenol fraction which comprises: passing the phenol fraction to a stripping zone wherein compounds boiling above the phenol are separated as a liquid from the resulting vaporous phenol effluent mixture containing said phenol; condensing the phenol effluent mixture; passing the mixture to a phenol distillation zone which mixture is an azeotropic liquid mixture of the phenol and contaminants, vaporizing a portion of said azeotropic liquid mixture to produce a vapor phase and a liquid phase; withdrawing and condensing said vaporous phase and passing said vaporous phase condensate to a confined holding zone; introducing a blanket of inert gas into said holding zone to pressurize the condensate and thus break the azeotrope and to maintain the condensation temperature of the vaporous effluent from the phenol distillation zone at least 25° above the operating temperature of the ketone distillation zone; recycling a portion of the condensate from the holding zone to the upper portion of the phenol distillation zone as reflux thereto; maintaining the operating temperature in said ketone distillation zone by passing said vaporous effluent from said phenol distillation zone, formed by distillation under the increased pressure imposed by said inert gas, in indirect heat exchange with said liquid ketone in a reboiling zone; and withdrawing a second liquid phenol fraction from said phenol distillation zone which second liquid fraction contains the phenol free of azeotropic mixtures with hydrocarbon contaminants.

References Cited by the Examiner

UNITED STATES PATENTS

| | | | |
|---|---|---|---|
| 2,324,255 | 7/43 | Britton et al. | 202—42 |
| 2,605,290 | 7/52 | Robertson et al. | 260—610 |
| 2,613,227 | 10/52 | Joris | 260—610 |
| 2,628,983 | 2/53 | Aller et al. | 260—621 |
| 2,630,456 | 3/53 | Bell et al. | 260—610 |
| 2,663,735 | 12/53 | Filar et al. | 260—621 X |
| 2,695,324 | 11/54 | Langlois | 260—621 X |
| 2,702,784 | 2/55 | Rossi | 260—621 X |
| 2,706,708 | 4/55 | Frank et al. | 260—610 X |
| 2,736,753 | 2/56 | Jacobs | 260—621 |
| 2,737,480 | 3/56 | Adams et al. | 260—621 X |
| 2,750,424 | 6/56 | Armstrong et al. | 260—621 X |
| 2,757,209 | 7/56 | Joris | 260—621 |
| 2,805,983 | 9/57 | Horsley | 202—42 |
| 2,815,389 | 12/57 | Geller et al. | 260—621 X |
| 2,824,048 | 2/58 | Hupe et al. | 260—621 |
| 2,836,546 | 5/58 | Faerber | 202—42 |
| 2,906,789 | 9/59 | McNaughtan | 260—621 X |

OTHER REFERENCES

"Azeotropic Data," pages 315–328 (14 pages). Pub. by American Chemical Society, Washington, D.C. (1952) Patent Office Library.

LEON ZITVER, *Primary Examiner.*

CHARLES B. PARKER, *Examiner.*